United States Patent [19]

Grader

[11] Patent Number: 4,643,743

[45] Date of Patent: Feb. 17, 1987

[54] PRESSURE SWING ADSORPTION PROCESS FOR SUPPLYING OXYGEN UNDER VARIABLE DEMAND CONDITIONS

[75] Inventor: Ronald J. Grader, East Amherst, N.Y.

[73] Assignee: Union Carbide Corporation, Danbury, Conn.

[21] Appl. No.: 465,434

[22] Filed: Feb. 10, 1983

[51] Int. Cl.$^4$ ............................................. B01D 53/04
[52] U.S. Cl. ........................................ 55/26; 55/62; 55/68; 55/75
[58] Field of Search .................. 55/18, 21, 25, 26, 62, 55/68, 75; 210/626–628, 188

[56] References Cited

U.S. PATENT DOCUMENTS

| | | | |
|---|---|---|---|
| 3,547,811 | 12/1970 | McWhirter | 210/627 |
| 3,547,812 | 12/1970 | McWhirter | 210/627 |
| 3,547,815 | 12/1970 | McWhirter | 210/627 |
| 3,660,277 | 5/1972 | McWhirter et al. | 210/627 X |
| 3,703,068 | 11/1972 | Wagner | 55/21 |
| 4,132,637 | 1/1979 | Key et al. | 210/627 X |
| 4,140,495 | 2/1979 | Pietruszewski | 55/21 |
| 4,178,239 | 12/1979 | Lowther | 210/627 X |
| 4,280,824 | 7/1981 | Lassmann et al. | 55/26 |
| 4,315,759 | 2/1982 | Benkmann | 55/25 X |
| 4,323,370 | 4/1982 | Leitgeb | 55/68 X |

*Primary Examiner*—Robert Spitzer
*Attorney, Agent, or Firm*—Alvin H. Fritschler

[57] ABSTRACT

In a pressure swing adsorption system for the supply of enriched oxygen to a variable demand wastewater treatment system, the oxygen product to feed air ratio is increased during periods of reduced oxygen demand, with the enriched oxygen being supplied to the wastewater treatment system at lower purity levels during such periods of reduced demand than the purity levels supplied under maximum demand conditions. Operation in this manner enables oxygen recovery to be enhanced and the power requirements to be reduced under such variable demand conditions.

22 Claims, No Drawings

PRESSURE SWING ADSORPTION PROCESS FOR SUPPLYING OXYGEN UNDER VARIABLE DEMAND CONDITIONS

BACKGROUND OF THE INVENTION

1. Field of the Invention

The invention relates to the supply of oxygen to a wastewater treatment system. More particularly, it relates to the supply of oxygen to such a treatment system from a pressure swing adsorption system under variable demand conditions.

2. Description of the Prior Art

Pressure swing adsorption (PSA) processes and systems are well known in the art for achieving desirable separation and purification of at least one gas component from a feed gas mixture of said component and at least one selectively adsorbable component. The selectively adsorbable component is adsorbed at a higher adsorption pressure after which the pressure is reduced to desorb said component from the adsorbent.

One use of the enriched oxygen product obtained in such PSA processes and systems is to supply suitable oxygen feed gas to a secondary wastewater treatment system. Such a system generally provides for the treating of water containing biologically oxidizable material with a gas containing at least about 50% oxygen by volume. Typically, such systems have been designed for the use of enriched oxygen product having a purity of about 90%, and PSA systems have been designed to supply enriched oxygen at this purity level to the wastewater treatment system.

Wastewater treatment systems of the type referred to above have an inherently variable demand for enriched oxygen product from the PSA system. Thus, such treatment systems are commonly designed for full capacity conditions that may not be fully achieved until the latter portions of the operating history of the facility in which said treatment systems are located. In addition, it is common for such wastewater treatment systems to exhibit variable load patterns as a function of daily or seasonable variations in water consumption. Accordingly, it is usually necessary for such wastewater treatment systems to be designed for maximum operating capacities that are expected to be fully utilized only during a portion of the expected operational life of the systems. In a similar manner, the pressure swing adsorption systems employed to supply enriched oxygen product to such variable demand wastewater treatment systems must likewise be designed for maximum production capabilities that are expected to be required only during a portion of the total operational history of a wastewater treatment facility. For a considerable portion of the operating time, therefore, the pressure swing adsorption systems in such facilities will be operated at lower than maximum capacity. It is highly desirable in the art, under such circumstances, to ensure that the PSA system employed to supply enriched oxygen to a variable demand wastewater treatment system can be operated in an efficient manner under reduced demand, i.e. less than full capacity, conditions.

During periods of reduced demand, a PSA-oxygen system might ordinarily be operated at a correspondingly lower product/feed ratio that pertains under said full capacity or design conditions. Under such conditions, however, less enriched oxygen product is produced, and the recovery of oxygen product is reduced. While the purity of the oxygen recovered is higher than design purity under such lower product/feed conditions, the performance characteristics of the overall PSA-wastewater treatment system is diminished since such higher purity oxygen is not required, particularly under conditions of reduced, i.e. less than design, oxygen demand. Accordingly, PSA-oxygen systems having more efficient turndown capabilities were desired in the art, leading to the improved PSA control technique of the Pietruszewski patent, U.S. Pat. No. 4,140,495, wherein the product/feed ratio is maintained at the design level under reduced demand conditions, rather than being reduced as in the previous approach referred to above. The technique of the patent results in the production of oxygen product during periods of reduced demand over the course of a longer PSA processing cycle than would be used under maximum design conditions. As a result, the unnecessarily higher oxygen purity levels previously obtained are avoided, and a constant oxygen product purity is obtained.

For secondary wastewater treatment systems of the type herein of interest, the utilization of the oxygen supplied by the PSA system is a function of the oxygen feed gas purity. Those skilled in the art will appreciate that, for a given oxygen demand, i.e. a fixed requirement of oxygen, the utilization of available oxygen in the feed gas to the wastewater treatment system will increase as the purity of the feed gas increases. An increase in purity results in a higher dissolution driving force and causes additional oxygen to be dissolved in the wastewater being treated. It is, of course, desirable for wastewater treatment systems to have a high oxygen utilization, which is the utilization of a substantial portion of the oxygen supplied in the feed gas for treatment of the wastewater rather than being vented from the wastewater treatment facility as part of the waste gas from said facility. Typically, wastewater treatment systems have been designed to utilize about 90% of the oxygen feed to said systems when operated at design capacity, and PSA systems are typically designed to supply enriched oxygen feed gas at about 90% by volume purity to said wastewater treatment systems.

While the PSA control technique of U.S. Pat. No. 4,140,495 represents a substantial improvement over the prior practice, the supply of oxygen to the wastewater treatment system at a constant, predetermined design purity level is found not to be necessary under reduced demand conditions. For example, although dissolved oxygen levels of about 6 mg/liter are considered satisfactory for particular wastewater treatment operations, it has been found not unusual, at reduced demand conditions, for the dissolved oxygen levels to reach 10 mg/liter or more so as to result in excessive dissolution of oxygen in the wastewater. In this regard, it should be noted that it is not readily possible to unload the liquid mixing and oxygen dissolution equipment associated with the wastewater treatment system so as to avoid such excessive dissolution while nevertheless maintaining the biomass in suspension during reduced demand conditions. In addition, the constant oxygen purity technique of the patent is found to result in a decreasing oxygen product recovery under decreasing oxygen demand conditions as contrasted with the recovery at maximum design demand. Such oxygen product recovery decrease, indicative of reduced PSA performance at reduced demand conditions, is believed to be related to a more diffuse mass transfer zone with the adsorption bed under low gas flow conditions as are applied during periods of reduced demand.

While the increased oxygen utilization and increased dissolved oxygen levels achieved during the practice of the technique disclosed in the patent are, of themselves, desirable, the benefits thereof are not such as to obviate the desire for further improvement in the PSA supply of oxygen to secondary wastewater treatment systems. In particular, it is desirable to achieve improved PSA performance, i.e. higher oxygen recoveries, than has heretofore been possible in the art. In addition, it is always desirable to achieve swings in the power consumption for applying oxygen to the wastewater treatment system.

It is an object of the invention, therefore, to provide an improved PSA process for the production of oxygen for delivery to variable oxygen demand wastewater treatment systems.

It is another object of the invention to provide a process for enhancing product recovery in such PSA oxygen operations.

It is a further object of the invention to provide PSA oxygen process having reduced power requirements in conjunction with the supply of oxygen to variable oxygen demand wastewater treatment systems.

SUMMARY OF THE INVENTION

The oxygen product/feed air ratio in a pressure swing adsorption system supplying oxygen to a variable oxygen demand wastewater treatment system is increased during periods of reduced oxygen demand. The enriched oxygen product is recovered at a lower purity level than the predetermined design level for maximum demand conditions. The product/feed ratio is adjusted between the conditions for maximum demand and the higher ratios for lower, variable demand such that the amount of oxygen released under lower purity conditions corresponds essentially to the reduced oxygen demands in the wastewater treatment system.

DETAILED DESCRIPTION OF THE INVENTION

The objects of improving recovery and reducing power consumption in pressure swing adsorption systems used in conjunction with variable oxygen demand wastewater treatment systems are thus accomplished by increasing the product feed rate and lowering product purity at times of reduced oxygen demand. For this purpose, the adsorption front of selectively adsorbed nitrogen is allowed to breakthrough at the product end of each adsorbent bed during the cocurrent depressurization step of the cycle. The enriched oxygen product is thereby released from the beds at a lower oxygen purity level than the predetermined design level. A reduced amount of enriched oxygen product is released under such lower purity conditions, with the amount of product nevertheless corresponding essentially to the reduced oxygen demand for the wastewater treatment system.

In the pressure swing adsorption process of the invention, oxygen is produced by the selective adsorption of nitrogen from a feed air stream in a pressure swing adsorption system having at least two adsorbent beds, with product oxygen being delivered to a variable oxygen demand wastewater treatment system. Each adsorbent bed undergoes, on a cyclic basis, a processing sequence that includes cocurrent depressurization from a higher adsorption pressure to one or more intermediate pressures, with release of an enriched oxygen stream from the product end of the bed; countercurrent depressurization to a lower desorption pressure and/or purge with release of selectively adsorbed nitrogen from the feed end of the bed; and repressurization to said higher adsorption pressure At least a portion of the gas released from one bed during the cocurrent depressurization step(s) is present to one or more other beds initially at lower pressures for pressure equalization and/or purge purposes. During periods of maximum oxygen demand for the wastewater treatment system, an oxygen product/feed air ratio is maintained such that the enriched oxygen product released from each bed is essentially at a predetermined design oxygen purity level corresponding to the maximum design oxygen demand in the wastewater treatment system. During such periods, the adsorption front of the selectively adsorbed nitrogen advances toward but does not reach, i.e. breakthrough, the product end of the bed. In the course of practical commercial operations, the product/feed ratio is adjusted between the conditions pertaining to maximum oxygen demand, wherein oxygen at a design purity level is in sufficient quantity to satisfy maximum or design oxygen demand in the wastewater treatment system and said conditions pertaining to lower, variable oxygen demand conditions, wherein oxygen product of decreasing purity is produced in response to lower oxygen demand in said wastewater treatment system.

In the practice of the invention, the enriched oxygen product of a pressure swing adsorption system is passed, at variable purity levels, to a variable oxygen demand, secondary wastewater treatment system. Such systems are well known in the art and generally involve the biochemical treatment of BOD (i.e., biological demand)-containing wastewater by oxidation. The operation of the wastewater treatment system does not constitute an essential part of the invention and is not described in detail herein for this reason. In general, however, BOD-containing water can be mixed with oxygen gas and active biomass in accordance with conventional wastewater treatment techniques. Further information concerning such techniques may be found in published literature, such as the Whirter patents, U.S. Pat. Nos. 3,547,811, 3,547,812, and 3,547,815. Although each secondary wastewater treatment systems are designed for operation at a given capacity, a significant amount of operating time is typically carried out under reduced load conditions as was pointed out in the background discussion above.

Maximum oxygen demand design conditions are typically based on the production of oxygen product of about 90% purity in the PSA system and the utilization of about 90% of said oxygen in the wastewater treatment system. It has been found that said nominal 90% design oxygen utilization can advantageously be maintained, during periods of reduced oxygen demand, at lower oxygen purities than said 90% purity utilized at full design, i.e. 100% demand conditions. In other words, under lower demand conditions, a desired oxygen utilization in the variable demand wastewater treatment system can be maintained by the use of lower purity oxygen. For example, at 80% oxygen demand, an oxygen product purity of about 84% is satisfactory to maintain said predetermined oxygen utilization level. Similarly, at 60% demand, a feed purity of about 76% will suffice, and at a lower oxygen demand of only 20%, an oxygen product purity from the PSA system of only about 61% will be satisfactory to maintain a design oxygen utilization in the variable demand wastewater treatment system. By adjusting the product/feed ratio in the PSA system between the conditions for maximum oxygen demand and the higher product/feed ratios pertaining for lower, variable oxygen demand conditions, the oxygen product purity of the PSA system is advantageously decreased in response to lower demand conditions in the wastewater treatment system. As a result, the design oxygen utilization for the wastewater treatment system can be maintained and enhanced PSA performance can be achieved. As indicated above, maintaining of the design oxygen purity, e.g. 90%, under lower oxygen demand conditions, does result favorably in the utilization of even more than the design oxygen utilization, e.g. 90%, in the wastewater treatment system, resulting in an increase in dissolved oxygen levels to higher than design conditions. While increased oxygen utilization and higher dissolved levels are, of themselves, somewhat beneficial, such benefits are found to be marginal relative to the improved PSA performance obtainable by the practice of the invention.

Lower oxygen product purities are satisfactory under lower, variable oxygen demand conditions because the oxygen dissolution capability of the wastewater treatment system is capable of supplying the required amount of oxygen at the desired utilization level under such lower oxygen purity conditions. By operating at higher product/feed ratio in the PSA system at reduced oxygen demand conditions, so as to produce oxygen of reduced purity, the oxygen recovery in the PSA system is significantly enhanced over the results obtainable using the improved PSA turndown control of U.S. Pat. No. 4,140,495. It has been found that the process of said patent, wherein the processing cycle is regulated relative to user demand so as to maintain a desired, constant purity of oxygen product, undergoes a decrease in oxygen recovery under lower demand conditions. Such decrease in recovery at lower oxygen demand conditions is believed to be related to the presence of a more diffuse mass transfer zone at low flow conditions.

In contrast to the drop in recovery below 100% design recovery at lower demand conditions for PSA systems producing constant purity product, the recovery of oxygen product actually increases appreciably relative to said 100% design point at reduced demand under the variable oxygen product purity conditions of the invention. This highly advantageous result arises from the fact that, in the practice of the invention, the PSA system is operated into bed breakthrough conditions during periods of lower, variable oxygen demand. Under such conditions, the mass transfer zone is not fully contained within the bed, and product purity is not constant throughout the product delivery step. To the contrary, the product purity drops below the nominal 90% design purity point as operation of the system continues during the cocurrent depressurization product step, with the lower product purity corresponding essentially to the reduced oxygen demand of the wastewater treatment system. In a representative comparative study, it was found that a constant product purity system has a decrease in product recovery to about 95% of design recovery at 80% oxygen demand conditions, while a corresponding variable product purity system operated in accordance with the invention experiences an increase in product recovery to about 105% at said 80% demand conditions. At a reduced demand of about 60%, the constant product purity system achieves a reduced product recovery of about 90% of design, while the variable, reduced product purity system achieves about 115% of design recovery under such reduced demand conditions. At about 20% demand conditions, product recovery for the constant product purity PSA system declines to about 85% of design recovery, whereas the variable purity system of the invention achieves nearly 130% recovery under such very much reduced oxygen demand conditions.

In addition to such dramatic increase in oxygen product recovery obtainable by the invention under turndown conditions, the power requirement of the pressure swing adsorption system can be reduced by the practice of the invention in conjunction with variable oxygen demand wastewater treatment systems. Thus, the practice of the invention utilizing reduced, variable purity oxygen during periods of lower, variable oxygen demand in the wastewater treatment system results in reduced power consumption compared with the previous improvement, constant purity approach throughout the entire range of system turndown. Those skilled in the art will appreciate that, at operations close to 100% oxygen demand in the wastewater treatment system, i.e. minor turndown conditions, little difference in power swings is observed. Throughout the oxygen demand range of about 20-80%, however, the variable purity, high product/feed operations of the invention result in about a 10% power savings relative to the reduced power consumption operation at a constant design oxygen purity level throughout such reduced demand conditions for a wastewater treatment system used in conjunction with essentially equivalent three bed pressure swing adsorption systems.

While the process of the invention can advantageously be practiced using various pressure swing adsorption systems having at least two adsorbent beds, it is particularly convenient to employ a three bed system in which feed air is passed to each bed in turn, in a suitable processing sequence with each bed alternatively supplying product oxygen gas to the wastewater treatment system and being regenerated in continuous cyclic operations. In a desirable three bed embodiment of the invention, the processing cycle in each bed comprises (1) cocurrent depressurization from higher adsorption pressure to lower intermediate pressures, (2) countercurrent depressurization from said intermediate pressure level to lower desorption pressure with release of gas from the feed end of the bed, (3) passage of gas from another bed in the system to the product end of the bed for purge thereof at said lower desorption pressure, (4) partial repressurization from lower desorption pressure to intermediate pressure(s) by the passage of gas released from at least one other bed undergoing cocurrent depressurization to said bed for pressure equalization therebetween; and (5) further repressurization from said intermediate pressure level to said higher adsorption pressure by passage of feed air to and said bed. During the cocurrent depressurization step, a portion of the enriched oxygen product released from the product end of the bed is passed as feed gas to the wastewater treatment system, and a portion of said oxygen product is passed, in turn, directly to at least one of the other beds initially at lower pressure for pressure equalization and/or purge purposes. In a particularly desirable embodiment, said partial repressurization step (4) comprises pressure equalization, in sequence, with both other beds in the three bed system, and step (5) includes the release of enriched oxygen product gas from said bed during at least a portion of the overall step time during which the pressure in said bed is increasing from said intermediate pressure level to said higher adsorption pressure.

Those skilled in the art will appreciate that various processing modifications can be made in the particulars of the process herein described without departing from the scope of the invention as recited in the claims appended hereto. For example, it is feasible to include a constant pressure adsorption step with release of oxygen product gas from the product end of the bed following repressurization of the bed to the higher adsorption pressure and before commencing cocurrent depressurization in the bed. In the desirable three bed cycle referred to above, however, such a constant pressure adsorption step is not employed. In a particularly preferred embodiment of said cycle, the cocurrent depressurization step in each bed, wherein enriched oxygen is released from the product end of the bed, provides such enriched oxygen gas in part for introduction as feed gas to the variable demand wastewater treatment system and in part for passage to the other beds in the system in an (a) first pressure equalization, (b) provide purge gas and (c) second pressure equalization sequence. In such particularly preferred embodiments, said further repressurization step (5) referred to above comprises (1) repressurization by the introduction of feed air to the feed end of the bed with no enriched oxygen product gas being withdrawn from the bed, and (2) further increasing pressure adsorption to said higher adsorption pressure with release of enriched product gas from the product end of the bed during said repressurization of the bed to the higher adsorption pressure. This provides a particularly advantageous PSA processing cycle for the overall purpose of the PSA system of the invention, namely the passing of enriched oxygen product, at variable purity levels, to said variable demand wastewater treatment system.

It will be appreciated that the PSA system employed in the practice of the invention will include the necessary conduits to connect the feed air to the adsorbent beds and to provide for enriched oxygen product removal and for waste gas discharge from the system. The system shown in FIG. 1 of U.S. Pat. No. 4,140,495 illustrates a conventional system suitable for carrying out the practice of the invention, with the square root converter associated with pulse generator 74 not being used in the practice of the invention.

The particularly desirable embodiment of the invention referred to above is summarized as a sequential nine step cycle similar to that of FIG. 4 of said U.S. Pat. No. 4,140,495. In an illustrative example of the practice of the invention in accordance with this embodiment, each bed starts in a clean condition and proceeds through the following steps, namely (1) partial repressurization from another bed, (2) combined product and feed end repressurization, (3) repressurization with feed gas from the feed end only, (4) repressurization from the feed end of the bed with product discharge from the product end of the bed, (5) cocurrent depressurization-pressure equalization with product discharge, (6) cocurrent depressurization with product discharge, (7) cocurrent depressurization-purge pressure equalization, (8) countercurrent depressurization and (9) purge ot the bed. At this point, the bed is ready to begin another such cycle. In the illustrative example, step (1) is carried out for 10 seconds with the first bed of the system being repressurized from the lowest process pressure, e.g., 0 psig, to a lower equalization pressure of 8 psig. Step (2) is carried out for 15 seconds, with a portion of the nitrogen-depleted gas released from the product end of the third bed of the system being passed to the product end of said first bed, which is like being repressurized by the passage of feed gas to the feed end thereof. The first bed is repressurized to 25 psig during this step. Step (3) is carried from the 25 second point of the cycle through 60 seconds. During step (4), which extends for a ten second period, repressurization of the first bed continues until a pressure of 40 psig is reached, whereupon an appropriate valve is closed so as to discontinue said repressurization. The pressure equalization of step (5) is carried out for a 15 second time period with the flow of oxygen enriched, i.e., nitrogen depleted, gas from the first bed product end passing to the product end of the second bed of the system at the same time that feed gas is also being introduced to the feed end of said second bed. The beds are equalized at a higher equalization pressure of 25 psig. The third bed, in the alternating processing sequence of the invention, is simultaneously countercurrently depressurized from 8 psig to the lowest pressure of the process during this time. Step (6) extends from approximately the 85 second to the 120 second point of the overall cycle. A portion of the cocurrent depressurization gas from the first bed flows to the product end of the third bed for an elapsed time of 25 seconds for countercurrent purge of the bed at lowest pressure. The step is terminated when a programmed quantity of product oxygen gas has been delivered from the first bed for passage to the wastewater treatment system. Pressure equalization step (7) is carried out for 10 seconds with the passage of gas from the first bed during cocurrent depressurization thereof passing to the third bed product end for pressure equalization of the beds at the lower pressure equalization level of 8 psig. The second bed, during this period in the sequential operation of the beds, is beginning its delivery of product gas during this period, with the simultaneous repressurization of said second bed by an increasing pressure adsorption step by the passage of feed gas to the feed end thereof being discontinued when the pressure in the bed reaches 40 psig. The first bed undergoes countercurrent depressurization to lowest pressure during step (8) lasting 10 seconds, from cycle time 130 to 145 seconds. The gas removed from the feed end of the first bed during this step is passed to a waste manifold for venting from the PSA system. Simultaneously, feed gas flow to the inlet end of the third bed commences for its repressurization from both ends of the bed, while a portion of the nitrogen depleted gas discharged from the product end of the second bed is passed to the product end of said third bed for pressure equalization at the higher pressure equalization level of 25 psig. In the final step (9) of the cycle, the first bed is purged by the flow of nitrogen depleted gas discharged from the product end of the second bed through a back pressure regulator for such purge purposes. The step is terminated when a programmed quantity of product has been delivered from the second bed for passage to the wastewater treatment system. The third bed is repressurized by the passage of feed gas to the feed end thereof during this time as the sequential operations continue on a cyclic basis in each bed of the system.

The product gas discharge period in the first bed, and in each bed of the system during said 9 step cycle comprises steps 4, 5 and 6. The total period for product delivery is conveniently divided into two parts when employing time delay control apparatus in the practice of the invention. The first part is of fixed duration set by a time delay relay, and the second part is of fixed product gas quantity as recorded by a counter. The relay and counter correspond to said relay 75 and said counter 77 illustrated in the conventional prior art system of FIG. 1 of U.S. Pat. No. 4,140,495. For example, the time delay could b.e set for 25 seconds and thereby correspond to the time period associated with steps (4) and (5) of the nine step cycle referred to above during normal operation at full design capacity. The second time period would be determined by a measure of the product gas quantity delivered during the cocurrent depressurization associated with step (6) in each bed. When operating at full design capacity in the illustrated embodiment, this step would normally continue for about 35 seconds. The product oxygen/feed ratio during such periods of maximum oxygen demand for the wastewater treatment system is maintained such that the enriched oxygen product released from the bed is essentially at a design oxygen purity level corresponding to the maximum design oxygen demand in the wastewater treatment system. At reduced demand conditions, however, this step (6) could continue for a longer period of time until a measured quantity of product gas is discharged from the bed. During such reduced demand periods, the oxygen product/feed air ratio in bed is actually increased, such that the enriched oxygen product is released from said beds is at a lower oxygen purity level than the predetermined design level. It will be appreciated that the adsorption front of the selectively adsorbed nitrogen will break through at the product end of the bed during such cocurrent depressurization under reduced demand conditions. It will also be appreciated that the amount of enriched oxygen product released from the bed under such lower purity conditions corresponds essentially to the reduced oxygen demand for the wastewater treatment system under said reduced demand conditions. At such lower purity conditions, e.g., relative to a design capacity point of 90% purity, product recovery is enhanced, and power requirements are reduced as discussed above.

It should be noted that, in the illustrative example, when the programmed quantity of gas during said step (6) has been reached, this step is terminated, and the cocurrent depressurization-second pressure equalization step (7) is initiated in the first bed. At the same time, the second bed is advanced from its partial repressurization to 37 psig step to begin its increasing pressure adsorption step. During this step, it begins product delivery while undergoing further repressurized to the higher adsorption pressure of 40 psig. The third bed is advanced from its purge step to its first partial repressurization during this time of step (7) in the first bed. Thus, gas discharged from the product end of the first bed during its cocurrent depressurization-pressure equalization step (7) is passed to the product end of the third bed for pressure equalization purposes between said beds. Each bed, in turn, will be understood to undergo the processing steps described with reference to the first bed as cyclic operations continue in the three bed system.

The product/feed ratio is adjusted in such continuous, cyclic operations, between the product/feed conditions associated with maximum oxygen demand, full design capacity conditions and the higher product/feed ratios applicable for lower, variable oxygen demand conditions, whereby oxygen product purity is decreased in response to lower oxygen demand. As contrasted to the conventional system, the process of the invention is advantageously carried out by the generation of control pulses proportional to the pressure drop associated with the product orifice rather than pulse generation directly proportional to product flow. If product demand through the orifice, corresponding to product orifice 72 of U.S. Pat No. 4,140,195, falls to about 50% of its full capacity amount, the pressure drop through the orifice will drop to about 25% of that associated with normal design capacity. For a given number of programmed pulses, such process control will result in allowing additional product flow relative to the conventional equipment of said U.S. Pat. No. 4,140,495 that employed a square root integrated associated with pulse generator 74 of said potential system based on maintaining a constant purity of product oxygen from the PSA system.

In the practice of the invention under reduced oxygen demand conditions, the cocurrent depressurization step in each bed will be understood to extend over a longer period of time than in the conventional system wherein a constant purity oxygen product is produced in the PSA system. As indicated above, each bed thus delivers product oxygen even when the mass transfer zone in the bed passes through the discharge end of the bed. As also indicated above, this circumstance, contrary to conventional practice, is satisfactory from the viewpoint of supplying oxygen to a variable demand wastewater treatment system in that, during periods of less than full or design oxygen demand, said demand can be adequately supplied with lower than design purity oxygen. In the practice of the invention at a reduced oxygen demand of 60% of design capacity, for example, operation of the system in accordance with the invention will allow satisfactory performance to be achieved at an oxygen product purity of about 76%, thereby resulting in a PSA oxygen recovery of about 54%. By contrast in the conventional practice wherein a design product purity of 90% is maintained, a PSA oxygen recovery of only about 42% is achieved.

In a typical comparative example based on operation of a PSA system so as to maintain the cocurrent depressurization step for about 35 seconds at normal design capacity, operation at the turndown mode associated with said U.S. Pat. No. 4,140,495 would involve a cocurrent depressurization step of about 65 seconds and operation in accordance with the invention would extend for a period of about 90 seconds in a comparable system operating under the same overall processing requirements. The additional time of product supply results in increased product delivery per unit of feed air, thereby providing improved oxygen recovery and resultant power savings.

Those skilled in the art will appreciate that various changes or modifications can be made in the details of the system and operation within the scope of the invention as hereinabove described. As noted, the invention can be applied to PSA systems having any desired number of adsorbent beds and any sequence of desired processing steps provided that the product delivery step includes operation under mass transfer breakthrough conditions so that a variable purity oxygen product is produced during times of reduced oxygen demand. It will be understood that various features such as suitable computer equipment combined with means for measuring the flow of oxygen product through the product discharge orifice can be employed to control product withdrawal so as to achieve the variable oxygen purity conditions of the invention. It will likewise be understood that, while the design oxygen utilization level is typically maintained during periods of reduced demand, the invention can also be practiced with reduced, i.e., less than design, oxygen utilization levels at reduced demand. Desirable power savings can be achieved in such embodiments of the invention. Those skilled in the art will also appreciate that the invention can be applied with respect to applications other than the wastewater treatment facilities referred to above. Thus, other oxygen utilization systems, such as some incineration process operations that can similarly accommodate lower purity oxygen product at variable reduced demand conditions, can be effectively carried out in conjunction with PSA systems for producing oxygen under variable purity conditions corresponding essentially to said reduced demand conditions. The invention will be seen, therefore, as providing a highly desirable and useful modification of pressure swing adsorption technology to effectively supply oxygen for operations susceptible to variable demand conditions.

I claim:

1. In a pressure swing adsorption process for the production of oxygen for delivery to a variable oxygen demand waste-water treatment system, said oxygen being produced by a pressure swing adsorption system capable of selectively adsorbing nitrogen, said system having at least two adsorbent beds, each of which undergoes, on a cyclic basis, cocurrent depressurization from a higher adsorption pressure to one or more intermediate pressures with release of an enriched oxygen stream from the product end of the bed; counter-current depressurization to a lower desorption pressure and/or purge with release of selectively adsorbed nitrogen from the feed end of the bed; and repressurization to said higher adsorption pressure, with at least a portion of the gas released from one bed during said cocurrent depressurization step(s) being passed to one or more other beds initially at lower pressures for pressure equalization and/or purge purposes, said pressure swing adsorption process being carried out in said system such that an adsorption front of the selectively adsorbed nitrogen is formed in each bed and advances toward the product end thereof during said cocurrent depressurization step, the improvement comprising:

(a) maintaining an oxygen product/feed air ratio in each bed in the system, during periods of maximum oxygen demand for said wastewater treatment system, such that the enriched oxygen product released from said bed is essentially at a design oxygen purity level corresponding to the maximum design oxygen demand in said wastewater treatment system, said adsorption front of said selectively adsorbed nitrogen advancing toward but not reaching the product end of the bed during the cocurrent depressurization of the bed to said intermediate pressure(s);

(b) increasing said oxygen product/feed air ratio in each bed, during periods of reduced oxygen demand in said wastewater treatment system, such that the enriched oxygen product released from said bed is at a lower oxygen purity level than the design level, said adsorption front of selectively adsorbed nitrogen breaking through at the product end of the bed during said cocurrent depressurization of the bed, the amount of enriched oxygen product released from said bed under the lower purity conditions corresponding essentially to the reduced oxygen demand for said wastewater treatment system; and (c) adjusting the product/feed ratio between the conditions of step (a) for maximum oxygen demand, wherein oxygen product is released essentially at said design oxygen purity level, and the higher product/feed ratios of step (b) for lower, variable oxygen demand conditions, wherein oxygen product is released at a lower oxygen purity level than said design level, thereby decreasing oxygen product purity in response to lower oxygen demand, whereby oxygen recovery is enhanced and power requirements are reduced in the operation of said pressure swing adsorption system in conjunction with said variable oxygen demand wastewater treatment system.

2. The process of claim 1 and including passing the enriched oxygen product, at said variable purity levels, to said variable demand wastewater treatment system.

3. The process of claim 2 in which said enriched oxygen product is maintained at sufficient purity levels, under said variable demand conditions, to essentially achieve a predetermined oxygen utilization level in said wastewater treatment system.

4. The process of claim 3 in which said predetermined oxygen utilization in said wastewater treatment system is about 90%.

5. The process of claim 4 in which said predetermined design oxygen purity level is about 90%.

6. The process of claim 5 in which, at a reduced demand of about 80%, the purity of said enriched oxygen product passed to said variable demand wastewater treatment system is on the order of about 84%.

7. The process of claim 5 in which, at a reduced demand of about 60%, the purity of said enriched oxygen product passed to said variable demand wastewater treatment system is on the order of about 76%.

8. The process of claim 5 in which, at a reduced demand of about 20%, the purity of said enriched oxygen product passed to said variable demand wastewater treatment system is on the order of about 61%.

9. The process of claim 1 in which said pressure swing adsorption system comprises three beds.

10. The process of claim 9 in which the processing cycle in each bed comprises:

(a) cocurrent depressurization from higher adsorption pressure to lower intermediate pressures, with a portion of the enriched oxygen product released from the product end of the bed being introduced as feed gas to said wastewater treatment system and a portion of said oxygen product being passed, in turn, directly to at least one of the other beds initially at lower pressure for pressure equalization and/or purge purposes;

(b) countercurrent depressurization from said intermediate pressure level to lower desorption pressure with release of gas from the feed end of the bed;

(c) passage of gas from another bed in the system to the product end of the bed for purge thereof at said lower desorption pressure;

(d) partial repressurization from lower desorption pressure to intermediate pressure(s) by the passage of gas released from at least one other bed undergoing cocurrent depressurization to said bed for pressure equalization therebetween; and (e) further repressurization from said intermediate pressure level to said higher adsorption pressure by the passage of feed air to said bed.

11. The process of claim 10 in which said partial repressurization step (d) comprises pressure equalization, in sequence, with both other beds in the system, and step (e) includes the release of enriched oxygen product gas from said bed during at least a portion of the overall step time during which the pressure in said bed is increasing from said intermediate pressure level to said higher adsorption pressure.

12. The process of claim 11 in which said cocurrent depressurization in each bed comprises a first pressure equalization, a provide purge gas and a second pressure equalization sequence, with a portion of the gas released during said cocurrent depressurization-first pressure equalization and said cocurrent depressurization-provide purge gas steps being introduced as feed gas to said wastewater treatment system.

13. The process of claim 12 in which said further repressurization step (e) comprises (1) repressurization by the introduction of feed air to the feed end of the bed with no enriched oxygen product gas being withdrawn from said bed, and (2) further increasing pressure adsorption to said higher adsorption pressure with release of enriched oxygen product gas from the product end of the bed during said repressurization of the bed to the higher adsorption pressure.

14. The process of claim 13 and including passing the enriched oxygen product, at said variable purity levels, to said variable demand wastewater treatment system.

15. The process of claim 14 in which said enriched oxygen product is maintained at sufficient purity levels, under variable demand conditions to essentially achieve a predetermined oxygen utilization level in said wastewater treatment system.

16. The process of claim 15 in which said predetermined oxygen utilization in said wastewater treatment system is about 90%.

17. The process of claim 16 in which said predetermined design oxygen purity level is about 90%.

18. The process of claim 17 in which, at reduced oxygen demands of about 80%, 60% and 20%, the purity of the enriched oxygen product passed to said variable demand wastewater treatment system is on the order of about 84%, 76% and 61%, respectively.

19. In a pressure swing adsorption process for the production of oxygen for delivery to a variable oxygen demand utilization system, said oxygen being produced by a pressure swing adsorption system capable of selectively adsorbing nitrogen, said system having at least two adsorbent beds, each of which undergoes, on a cyclic basis, cocurrent depressurization from a higher adsorption pressure to one or more intermediate pressures with release of an enriched oxygen stream from the product end of the bed; countercurrent depressurization to a lower desorption pressure and/or purge with release of selectively adsorbed nitrogen from the feed end of the bed; and repressurization to said higher adsorption pressure, with at least a portion of the gas released from one bed during said cocurrent depressurization step(s) being passed to one or more other beds initially at lower pressures for pressure equalization and/or purge purposes, said pressure swing adsorption process being carried out in said system such that an adsorption front of the selectively adsorbed nitrogen is formed in each bed and advances toward the product end thereof during said cocurrent depressurization step, the improvement comprising:

(a) maintaining an oxygen product/feed air ratio in each bed in the system, during periods of maximum oxygen demand for said utilization system, such that the enriched oxygen product released from said bed is essentially at a design oxygen purity level corresponding to the maximum design oxygen demand in said utilization, said adsorption front of said selectively adsorbed nitrogen advancing toward but not reaching the product end of the bed during the cocurrent depressurization of the bed to said intermediate pressure(s);

(b) increasing said oxygen product/feed air ratio in each bed, during periods of reduced oxygen demand in said utilization system, such that the enriched oxygen product released from said bed is at a lower oxygen purity level than the design level, said adsorption front of selectively adsorbed nitrogen breaking through at the product end of the bed during said cocurrent depressurization of the bed, the amount of enriched oxygen product released from said bed under the lower purity conditions corresponding essentially to the reduced oxygen demand for said oxygen demand utilization system; and (c) adjusting the product/feed ratio between the conditions of step (a) for maximum oxygen demand, wherein oxygen product is released essentially at said design oxygen purity level, and the higher product/feed ratios of step (b) for lower, variable oxygen demand conditions, wherein oxygen product is released at a lower oxygen purity level than said design level, thereby decreasing oxygen product purity in response to lower oxygen demand, whereby oxygen recovery is enhanced and power requirements are reduced in the operation of said pressure swing adsorption system in conjunction with said variable oxygen demand utilization system.

20. The process of claim 19 and including passing the enriched oxygen product, at said variable purity levels, to said variable demand oxygen utilization system.

21. The process of claim 20 in which said enriched oxygen product is maintained at sufficient purity levels, under said variable demand conditions, to essentially achieve a desired oxygen utilization level in said wastewater treatment system.

22. The process of claim 19 in which the pressure swing adsorption system comprises three beds.

* * * * *